Sept. 28, 1943.  J. C. ALBRIGHT  2,330,658

WELDING DEVICE

Filed June 8, 1942  4 Sheets-Sheet 1

Inventor
John C. Albright
by Parker & Carter
Attorneys.

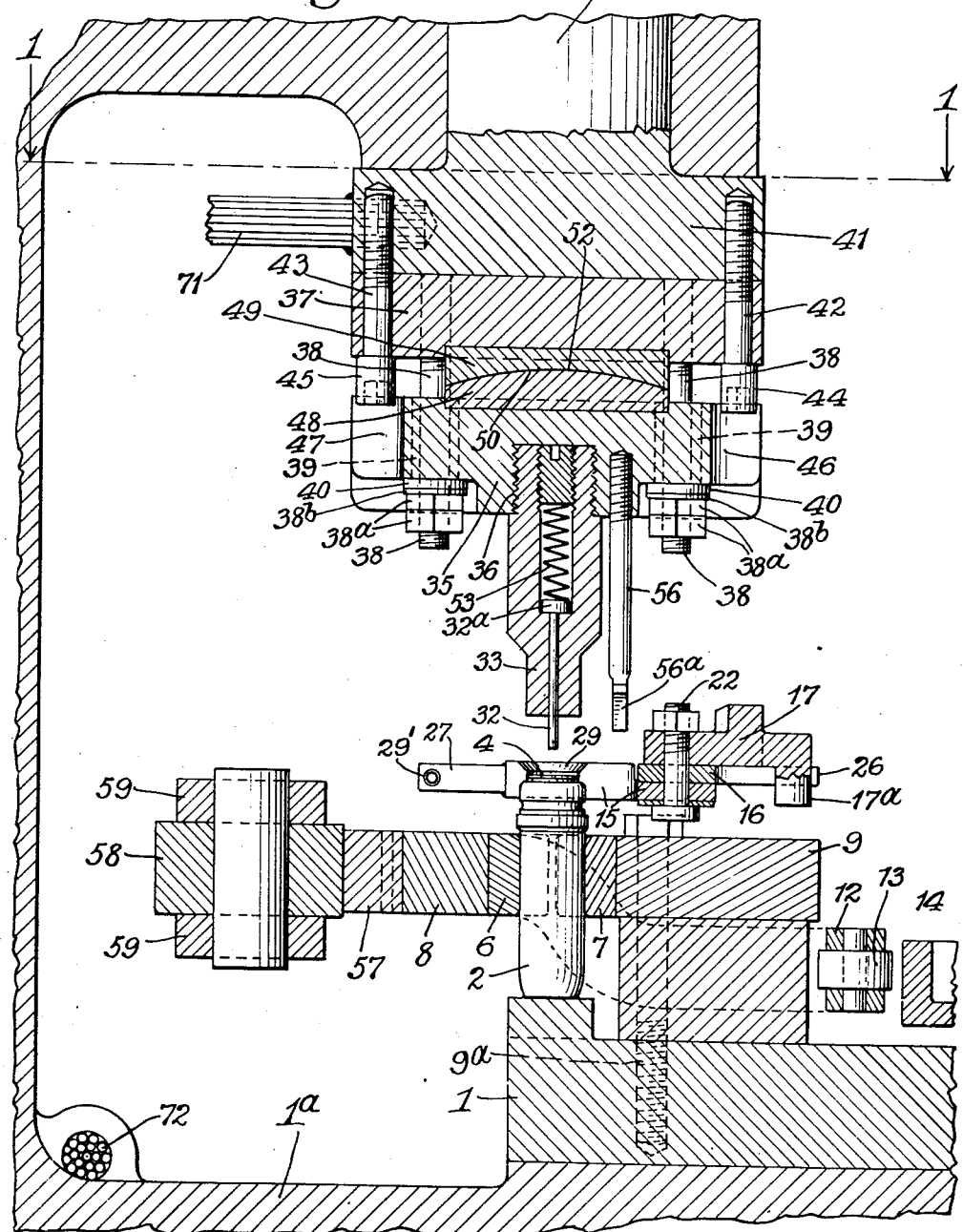

Sept. 28, 1943.　　　　J. C. ALBRIGHT　　　　2,330,658
WELDING DEVICE
Filed June 8, 1942　　　　4 Sheets-Sheet 3
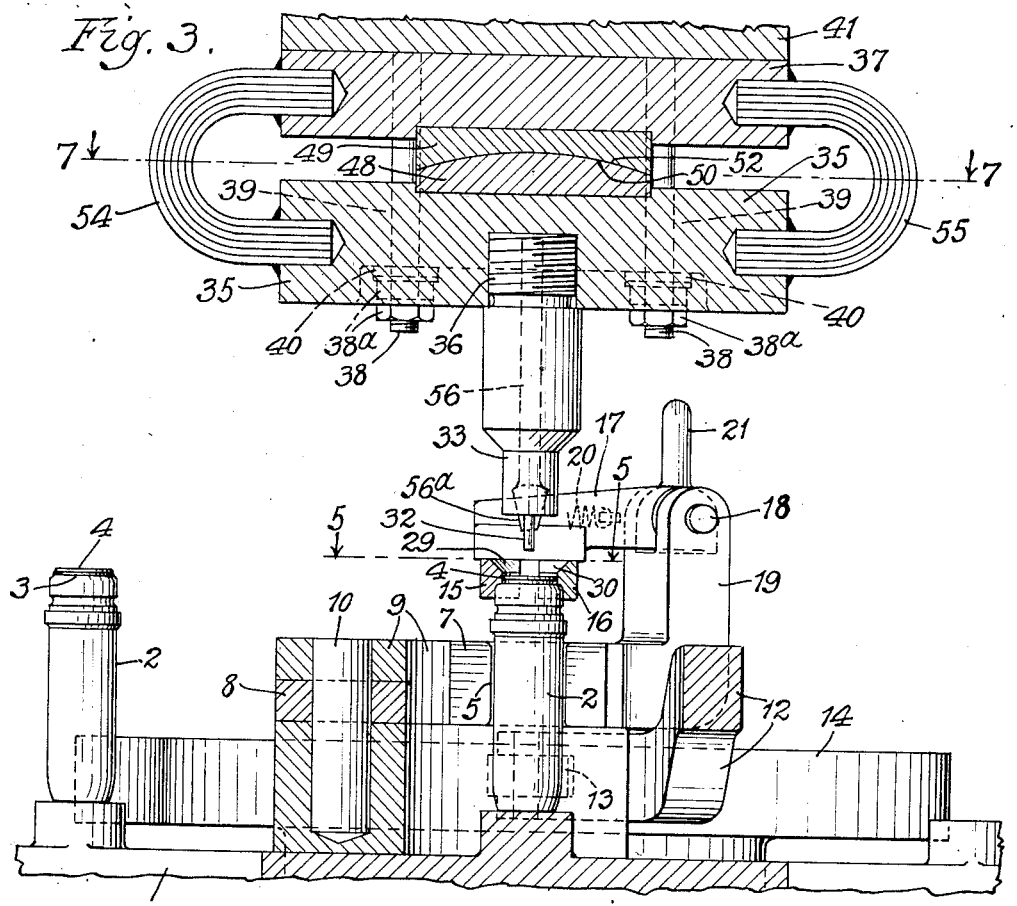
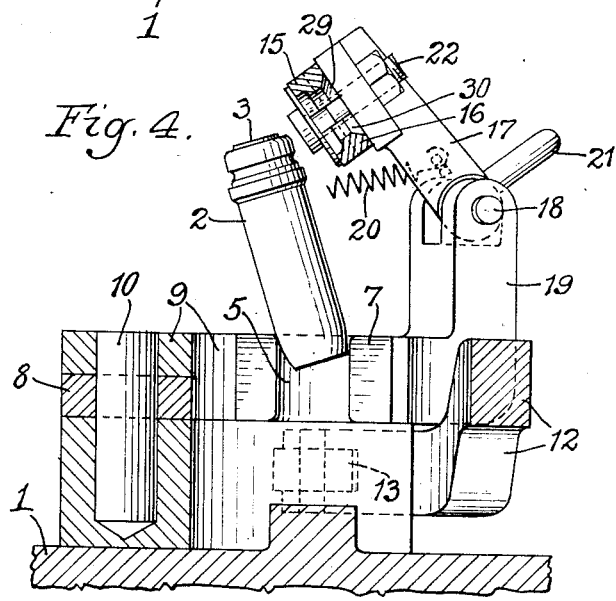
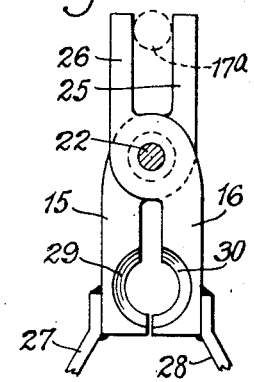
Inventor.
John C. Albright
by Parker & Carter
Attorneys.

Sept. 28, 1943.　　J. C. ALBRIGHT　　2,330,658
WELDING DEVICE
Filed June 8, 1942　　4 Sheets-Sheet 4
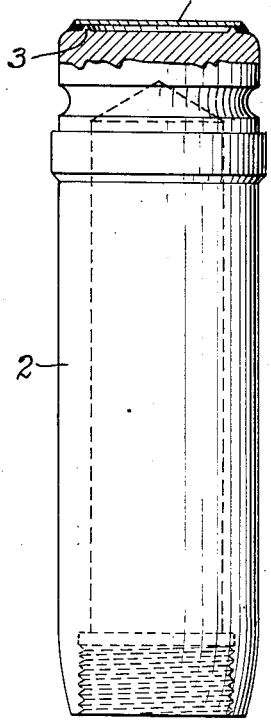
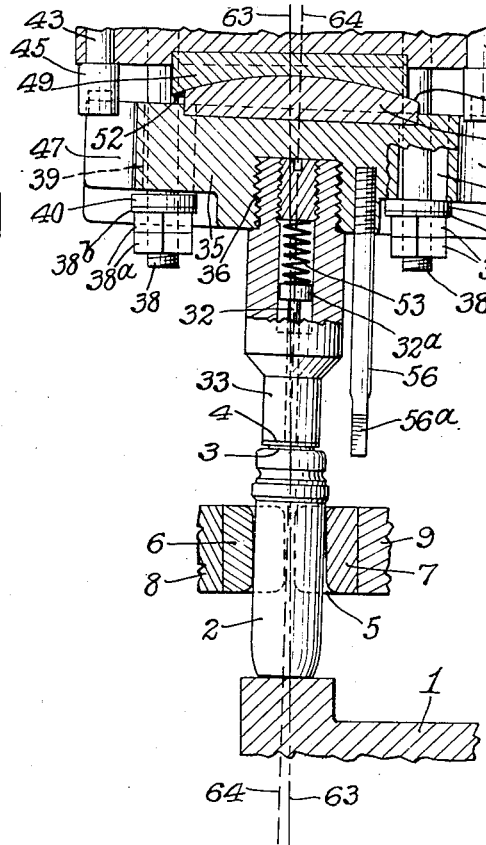
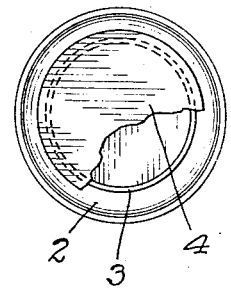
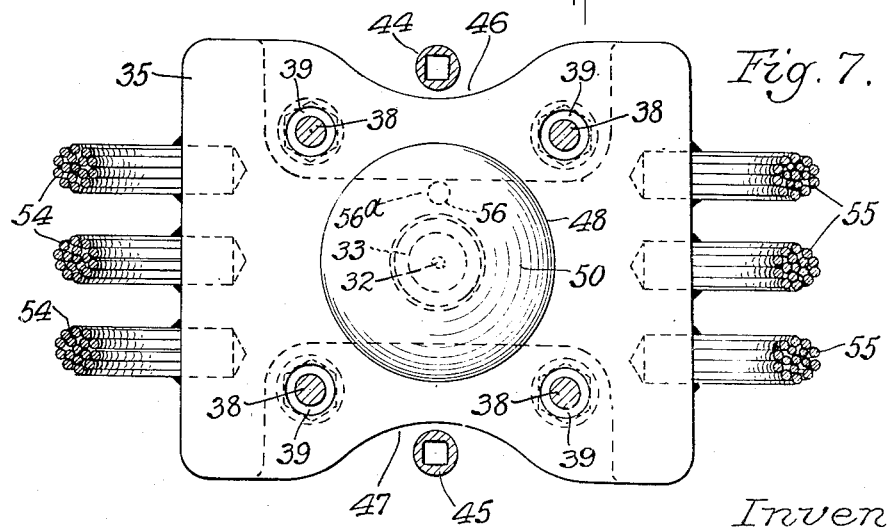
Inventor
John C. Albright
by Parker & Carter
Attorneys.

Patented Sept. 28, 1943

2,330,658

UNITED STATES PATENT OFFICE 2,330,658

WELDING DEVICE

John C. Albright, Chicago, Ill., assignor to The Dole Valve Company, Chicago, Ill., a corporation of Illinois Application June 8, 1942, Serial No. 446,177

10 Claims. (Cl. 219—4)

This invention relates to welding devices and has for its object to provide a new and improved device of this description.

The invention has as a further object to provide a self-aligning electrical welding device.

The invention has as a further object to provide an electrical welding device for welding metal pieces together.

The invention has as a further object to provide an electrical welding device for welding metal pieces to elongated bodies.

The invention has as a further object to provide a welding device particularly adapted for welding metal discs to the ends of projectiles.

The invention has as a further object to provide a welding device which will weld the discs to the projectiles so that they will always be accurately centrally located and accurately concentric with the ends of the projectiles.

The invention has other objects which are more particularly pointed out in the accompanying description.

Referring now to the drawings,

Fig. 2 is an enlarged sectional view taken on line 2—2 of Fig. 1;

Fig. 3 is a sectional view taken on line 3—3 of Fig. 1;

Fig. 4 is a sectional detail similar to Fig. 3 with parts omitted, showing the disc centering device raised to allow loading of the machine with the projectiles;

Fig. 5 is a sectional view taken on line 5—5 of Fig. 3;

Fig. 6 is a sectional view similar to Fig. 2, showing the tilting of the projectile and electrode;

Fig. 7 is a sectional view taken on line 7—7 of Fig. 3;

Fig. 8 is an enlarged side elevation of the projectile with parts broken away;

Fig. 9 is an enlarged end view of the projectile with parts broken away;

Fig. 10 is a sectional view showing a different form of disc.

Like numerals refer to like parts throughout the several figures. The invention can be used for welding many different pieces together. For purposes of illustration, I have shown it as being used to weld metal discs to projectiles.

Figure 1:
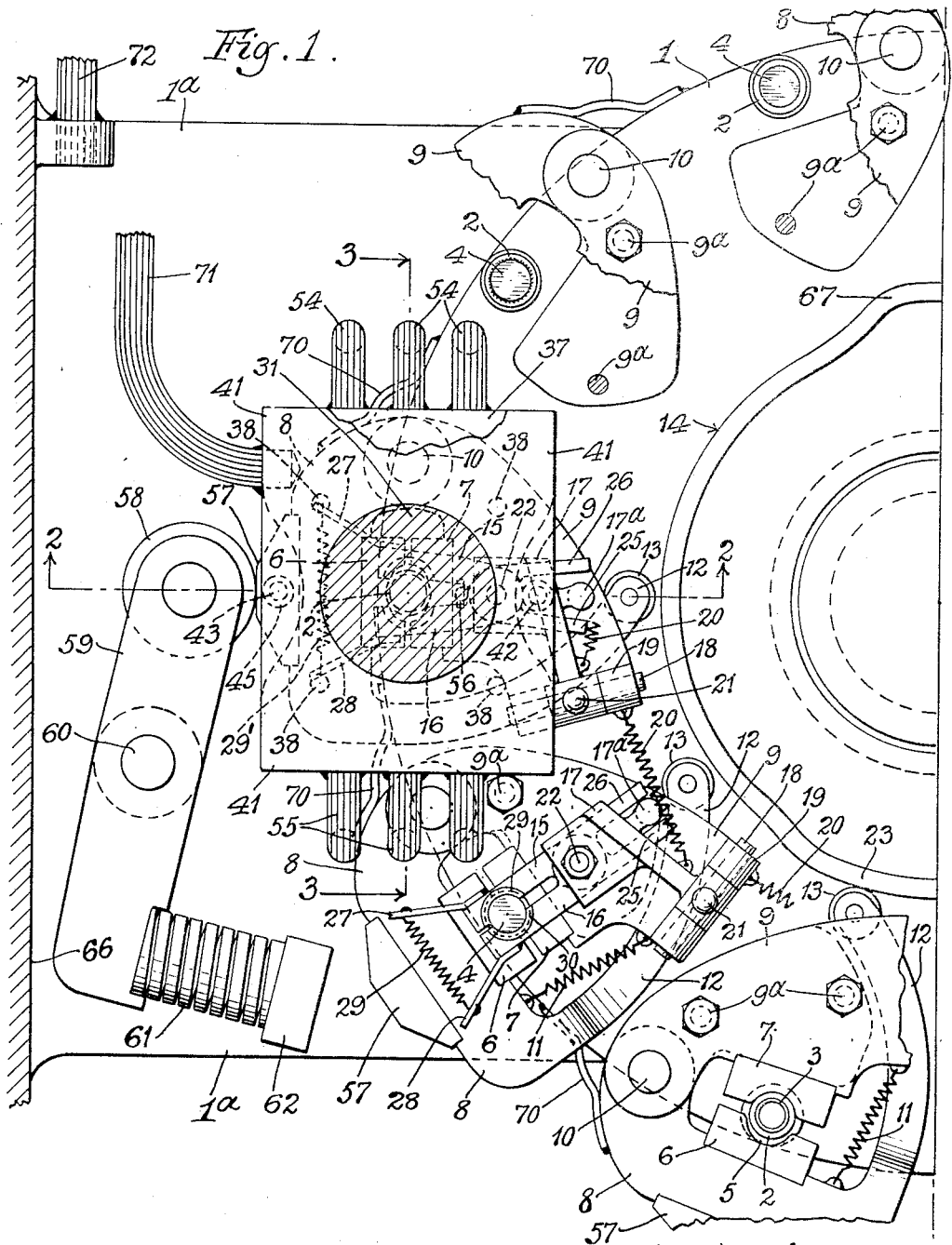
Fig. 1 is a sectional plan view on line 1—1 of Fig. 2 with parts omitted, showing one form of the self-aligning electrical welding device.

In the construction herein shown, there is a rotary table or receiving device 1 upon which a number of elongated bodies such as the projectiles 2 may be placed. Each projectile has at one end a concentric upstanding ring 3. The receiving device is provided with a plurality of holding devices which hold the projectiles in position. These holding devices are all similar and each of them will be given the same reference numeral.

There is a stationary welding electrode, and the receiving device is moved forward step by step so as to successively bring the projectiles in welding position with relation to the stationary welding electrode so that a metal piece such as a disc 4, preferably of steel, can be welded thereto. The rotary receiving device and the stationary welding electrode are mounted upon a suitable frame 1a.

Each projectile is placed in a receiving space 5 located between the projecting holding members 6 and 7 which are fastened to the supports 8 and 9 pivotally connected together by the pivot 10 (Figs. 1, 3 and 4). The support 8 is movable. The support 9 is fixed in position by means of the fastening devices 10. The supports 8 and 9 are elastically connected together by a spring 11 which normally holds the holding members 6 and 7 in contact with the projectile. Each of the supports 8 is provided with an arm 12 to which is attached a roller 13 which engages a stationary cam 14.

There is a centering device for centering the disc 4 upon the upper end of the projectile. As herein shown, this centering device comprises two jaws 15 and 16 connected to a supporting device 17 which is mounted upon a pivot 18 supported by an upstanding support 19. The upper end of the support 19 is bifurcated and the ends of the support 17 project into the space formed by the two members. Each adjacent supporting member 17 and support 19 are connected together by a spring 20. In the particular construction shown, there is a handle 21 by means of which this supporting device and jaws 15 and 16 are manipulated. These jaws are pivoted together by the pivot 22 (Figs. 1, 2, 4 and 5). As the projectile approaches the welding device, the roller 13 on the member 8 engages the outwardly projecting part 23 on the cam 14 and the support 8 is moved out so as to separate or open the holding members 6 and 7, so as to permit the projectile 2 to be placed in position between these holding members ready for welding, the disc centering device being held up out of the way by means of the handle 21. After the projectile 2 is placed in position the roller 13, as the receiving device moves forward, is disengaged from the outwardly projecting part 23 of the cam 14 and the spring 11 causes the holding member 6 on the support 8 to be moved toward the other holding member 7 to grip the projectile. The disc centering device is then lowered by means of the handle 21, or any other means, and the members are held in position by the spring 20 so as to surround the upper end of the projectile. The jaws 15 and 16 are provided with the tail pieces 25 and 26 and the support 17 is provided with the downwardly projecting member 17a (Figs. 1, 2 and 5) which passes in between these tail members 25 and 26 so as to insure the proper centering position of the centering device. The jaws 15 and 16 have extensions 27 and 28 with a spring 29' connecting them, which holds the jaws closed. This spring also holds the tail pieces 25 and 26 in contact with the projection 17a thereby holding the jaws in a radial position.

The disc 4 is then dropped into the opening between the jaws 15 and 16, the jaws being preferably provided with beveled faces 29, 30 to insure the disc being properly centered on top of the projectile and in proper engagement with the upstanding ring 3. The plunger 31 of the welding mechanism is then moved down by any suitable power means and the pin 32, carried by the welding electrode 33, brought into contact with the disc 4. The welding electrode 33 is connected to the plunger 31 by an adjustable connection.

In the particular construction shown, the electrode 33 is connected to the member 35 by a threaded connection, as shown at 36. The member 35 is connected to the member 37 by means of bolts 38 which pass through enlarged holes in the member 35 so as to provide a space 39 between the bolts and the walls of the holes to permit automatic adjustment of the parts, as hereinafter set out. Some elastic means is associated with these bolts to permit this relative movement. As herein shown, there are elastic or rubber washers 40 between the member 35 and the nuts 38a. Metal washers 38b may be placed between the washers 40 and the nuts 38a to protect the rubber washers when the nuts are tightened. The member 37 is connected to the end 41 of the plunger 31 by the bolts 42 and 43. These bolts are provided with heads or ends 44 and 45. The member 35 is provided at its sides with the recesses 46 and 47 into which the lower ends 44 and 45 project.

There is interposed between the member 37 and the member 35, to which electrode 33 is connected, a self-adjusting device which consists of the two members 48 and 49. The member 48 is preferably fixed to the member 35 and the member 49 is preferably fixed to the member 37. Any suitable means for fastening the members in position may be used. Since these members receive high pressure while the welding is going on, they must be of rigid material, preferably of hard metal; the metal of one of said members is preferably softer than the metal of the other members. One of these members, as for example the member 48, has its face 50 spherical in shape, that is this surface is a surface of a part of a sphere. The member 49 has its opposed face 52 of a similar spherical shape.

The pin 32 connected to the electrode 33 has a head 32a which limits its downward motion. There is a spring 53 which presses this pin downwardly. The members 35 and 37 are connected together by the flexible electrical conductors 54 and 55 which are connected in any suitable manner to the source of current supply. These conductors supply current to the electrode 33. The other electrode, the receiving device 1, is connected in any suitable manner with the other terminal of the source of current supply.

During the downward movement of the plunger 31, and before the electrode 33 engages the disc 4, the pin 32 holds the disc in proper centered position. Before the electrode 33 engages the disc 4, the member 56, which has a wedge-shaped lower end 56a, passes in between the jaws 15 and 16 so as to separate them and permit the electrode 33, as it moves down, to engage the disc 4. The electrode is moved into contact with this disc so as to exert a heavy pressure thereon. The welding current passes through the electrode 33, the disc 4 and projectile 2, into the receiving member 1 and the frame of the machine, thence back to the source of electric supply.

Some means is preferably provided for pressing the holding members 6 and 7 tightly against the projectile, so as to hold the projectile against movement while the disc 4 is being welded thereto. As herein shown, there is provided for that purpose a projection 57 on each member 8 having inclined faces. As the projectile reaches the welding position (Fig. 1) this projection engages a roller 58 on one end of an arm 59 pivoted at 60 to the fixed frame 1a of the machine so as to move said arm outwardly. The movement of this arm is resisted by a strong spring 61 which abuts a fixed part 62 on the frame 1a. This spring causes a strong pressure to be exerted on the movable member 6 to move it toward the opposed fixed member 7 to tightly clamp the projectile in position while the disc is being welded thereto.

In view of the extreme accuracy required in placing disc 4 perfectly concentric with the end of the projectile at the time it is welded thereto, the automatic self-adjusting mechanism, hereinbefore described, between the electrode 33 and its support is essential to the successful operation of the device. This will be appreciated when it is noted that any particle of dust between the members 6 and 7 will tend to throw the projectile out of alignment with the welding electrode 33 if the electrode is fixed in position. Furthermore, in the movement of the receiving device 1, it is not practicable to make the device accurate enough to cause the projectile to always stop directly under the electrode 33. By means of the present device, these discrepancies are taken care of. With this device, when the electrode 33 is moved down to forcibly engage the disc 4 on top of the projectile, the spherical members 48 and 49 will move relatively in any direction around the complete circle so as to bring the central axis of the projectile into alignment with the central axis of the electrode 33 so that the face of the electrode will be absolutely at right angles to the axis of the projectile, thereby insuring the proper engagement of the disc all the way around with the ring on the projectile. A self-aligning electrical welding device is thus produced. I have attempted to illustrate this in an exaggerated form in Fig. 6, wherein the line 63 represents the vertical center line through the plunger. When the projectile is out of alignment with the electrode 33 and the electrode is forced down upon the disc on top of the projectile, the electrode 33 will be moved due to the pressure applied thereto by the plunger so that the center line 64 through the projectile will become the center line through the electrode and will be different from the center line 63 through the plunger. This insures the central concentric location of the disc 4 when the welding current is applied.

After the welding is completed, the rotation of the receiving member 1 moves the projection 57 out of contact with the roller 58, thereby releasing the clamping pressure on the projectile, so that it may be easily removed. The inward movement of the roller 58 is limited by the other end of the lever engaging a fixed stop 66 which is shown as a part of the frame 1a of the machine. Upon the further rotation of the receiving member 1, the projectile with the disc welded thereto is moved to a position where the roller 13 on the member 8 engages the outwardly projecting part 67 of the fixed cam 14, thus moving the support 8 and the holding member 6 to its open position to discharge the projectile.

Each of the supports 9 is fastened to the table 1 by the bolts 9a and, therefore, there is a good electrical connection from the projectile to the table. The support 8, however, is movable and is connected to the table 1 by the pivot 10 so that the electrical connection is not good and there might be sparking. To prevent this, each of the supports 8 is provided with a large spring connection 70 which is fastened by welding, or otherwise, to the table 1 and which exerts sufficient pressure on the support 8 to form a good electrical connection between the support 8 and the table 1.

Any of the suitable means now in use in connection with welding can be used for supplying the welding current. For purposes of illustration, I have shown an electrical connection between the conductor 71 and the member 41 and an electrical connection between the conductor 72 and the frame 1a. The particular electrical connections are not a part of the present invention.

In Fig. 10 there is shown a different form of disc which is simpler and cheaper to make. In this construction instead of having the ring 3 on the end of the projectile, it is formed in the disc by stamping the disc to form a projecting ring 69 thereon. This avoids the expense of forming the ring 3 on the projectile.

In the welding operation, a very heavy current is used and it is important that this heavy current does not pass through the spherical shaped members 48 and 49 as there may be produced sparks and pitting, and these members may be so marred or injured as to prevent their proper operation. To prevent this, there is arranged means for by-passing the current around these members 48 and 49 by means of the conductors 54 and 55 (Fig. 7). It will be noted that these conductors are connected to the supporting member to which the electrode is connected and to the power applying member by being connected to the members 35 and 37. It will thus be seen that this heavy current, instead of passing through the members 48 and 49, having spherical engaging surfaces, passes around these members. This prevents injury to the members by sparking or pitting, or otherwise, so that this current does not interfere with the proper relative movement of the members. The engaging faces of these members are preferably provided with oil so as to insure the proper easy adjustment between them to secure the proper alignment between the device to be welded and the electrode.

I claim:

1. A welding device for welding metal pieces together comprising a holding member, a holding device thereon for holding separate pieces to be welded together, an electrode beneath which said separate pieces are brought, a power applying member for moving said electrode into contact with one of the separate pieces, comprising two opposed parts with a space between them, said parts fastened together but relatively movable, two adjustable members of rigid material located in said space one fixed to one of said opposed parts and the other fixed to the other of said opposed parts, said adjustable members having contacting spherical shaped faces, one face being convex and the other face being concave.

2. A welding device for welding metal pieces together comprising a holding member, a holding device thereon for holding separate pieces to be welded together, an electrode beneath which said separate pieces are brought, a power applying member for moving said electrode into contact with one of the separate pieces, a supporting member to which said electrode is connected, a rigid adjustable member connected to said supporting member having a spherical shaped face, a second rigid adjustable member connected with the power applying member and having a cooperating spherical shaped face, the two spherical shaped faces being in engagement, connecting devices connecting said supporting member with said power applying member, enlarged openings in said supporting member through which said connecting devices pass.

3. A welding device for welding metal pieces together comprising a holding member, a holding device thereon for holding separate pieces, an electrode beneath which said separate pieces are brought, a power applying member for moving said electrode into contact with one of the separate pieces, a supporting member to which said electrode is connected, a rigid adjustable member connected to said supporting member having a spherical shaped face, a second rigid adjustable member connected with the power applying member and having a cooperating spherical shaped face, bolts connecting said supporting members with said power applying member, enlarged openings in said supporting member through which said bolts pass, nuts on said bolts and rubber washers interposed between said nuts and said supporting member.

4. A welding device for welding metal pieces together comprising a holding member, a holding device thereon for holding said pieces, an electrode beneath which said pieces are brought, a centering device for centering said pieces with relation to each other, a power applying member for moving said electrode into contact with one of said metal pieces, comprising two opposed parts with a space between them, said parts fastened together but relatively movable, two adjustable members of rigid material located in said space one fixed to one of said opposed parts and the other fixed to the other of said opposed parts, said adjustable members having contacting spherical shaped faces, one face being convex and the other face being concave, the pressure of said power applying member, when the central axes of the pieces and the electrode are out of alignment, causing said adjustable members to move relatively to bring said axes into alignment.

5. A welding device for welding metal pieces to elongated bodies comprising a rotatable table, separated holding devices thereon for holding a plurality of elongated bodies, an electrode beneath which said bodies are successively brought, centering devices for centering said metal pieces concentric with the ends of the bodies, a power applying member for successively moving said electrode into contact with said metal pieces, a supporting member to which said electrode is connected, a rigid adjustable member connected to said supporting member having a spherical shaped face, a second rigid adjustable member connected with the power applying member and having a cooperating spherical shaped face, the two spherical shaped faces being continuously in engagement, connecting devices connecting said supporting member with said power applying member, enlarged openings in said supporting member through which said connecting devices pass, the pressure of said power applying member, when the central axes of said body and the electrode are out of alignment, causing said adjustable members to move relatively to bring the axes into alignment.

6. A welding device for welding metal discs to projectiles comprising a rotatable table, separated holding devices thereon for holding a plurality of projectiles, an electrode beneath which said projectiles are successively brought, centering devices for centering discs concentric with the ends of the projectiles, a power applying member for successively moving said electrode into contact with said discs, a supporting member to which said electrode is connected, a rigid adjustable member connected to said supporting member having a spherical shaped face, a second rigid adjustable member connected with the power applying member and having a cooperating spherical shaped face, the two spherical shaped faces being in engagement, bolts connecting said supporting member with said power applying member, enlarged openings in said supporting member through which said bolts pass, nuts on said bolts, rubber washers interposed between said nuts and said supporting member, the pressure of said power applying member, when the central axes of the projectile and the electrode are out of alignment, causing said adjustable members to move relatively to bring the axes into alignment.

7. A welding device for welding metal discs to projectiles comprising a rotatable table, separated holding devices thereon for holding a plurality of projectiles in a substantially vertical position, an electrode beneath which said projectiles are successively brought, centering devices for centering said discs concentric with the ends of the projectiles, a power applying member for successively moving said electrode into contact with said discs, an adjustable connection between said electrode and said power applying member for providing a relative movement between the power applying member and the electrode to bring the center line of the electrode into alignment with the center line of the projectile at the time the welding takes place, said adjustable connection comprising two rigid members out of contact with said electrode, said members having spherical shaped engaging faces, one of which is concave and the other of which is convex.

8. A welding device for welding metal discs to projectiles comprising a rotatable table, separated holding devices thereon for holding a plurality of projectiles in a substantially vertical position, an electrode beneath which said projectiles are successively brought, centering devices for centering said discs concentric with the ends of the projectiles, a power applying member for successively moving said electrode into contact with said discs, an adjustable connection between said electrode and said power applying member for providing a relative movement between the power applying member and the electrode to bring the center line of the electrode into alignment with the center line of the projectile at the time the welding takes place, said adjustable connection comprising two rigid members both located in planes above said electrode having spherical shaped engaging faces, one of which is concave and the other of which is convex, both of said rigid adjustable members being of metal, the metal of one member being softer than that of the other.

9. A welding device for welding metal pieces together comprising a holding member, a holding device thereon for holding separate pieces to be welded together, an electrode beneath which said separate pieces are brought, a power applying member for moving said electrode into contact with one of the separate pieces, comprising two opposed parts with a space between them, one of said parts movably attached to the other said parts having opposed recesses, two adjustable members of rigid material located in said space each projecting into one of said recesses, said adjustable members having contacting spherical shaped engaging faces, one face being convex and the other face being concave, and two electrical connections between said two opposed parts and on opposed sides of said concave and convex adjustable members.

10. A welding device for welding metal pieces together comprising a holding member, a holding device thereon for holding separate pieces to be welded together, an electrode beneath which said separate pieces are brought, a power applying member for moving said electrode into contact with one of the separate pieces, a supporting member to which said electrode is connected, the power applying member and supporting member having a space between them, a rigid adjustable member located in said space and connected to said supporting member having a spherical shaped face, a second rigid adjustable member located in said space and connected with the power applying member and having a cooperating spherical shaped face, the two spherical shaped faces being in engagement, an electrical conductor connected with said power applying member and said supporting member spanning the space between them and located at one side of said rigid adjustable members.

JOHN C. ALBRIGHT.